United States Patent
Ichihara et al.

(10) Patent No.: US 11,223,053 B2
(45) Date of Patent: Jan. 11, 2022

(54) FUEL CELL

(71) Applicant: NISSAN MOTOR CO., LTD., Yokohama (JP)

(72) Inventors: Keiji Ichihara, Kanagawa (JP); Takao Izumi, Kanagawa (JP); Keita Iritsuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 7 days.

(21) Appl. No.: 16/321,394

(22) PCT Filed: Jul. 29, 2016

(86) PCT No.: PCT/JP2016/072443
§ 371 (c)(1),
(2) Date: Jan. 28, 2019

(87) PCT Pub. No.: WO2018/020686
PCT Pub. Date: Feb. 1, 2018

(65) Prior Publication Data
US 2019/0173106 A1 Jun. 6, 2019

(51) Int. Cl.
*H01M 8/0273* (2016.01)
*H01M 8/0247* (2016.01)
(Continued)

(52) U.S. Cl.
CPC ......... *H01M 8/0273* (2013.01); *H01M 8/028* (2013.01); *H01M 8/0247* (2013.01); *H01M 8/0276* (2013.01); *H01M 8/242* (2013.01); *H01M 8/2425* (2013.01); *H01M 8/2465* (2013.01); *H01M 8/2483* (2016.02); *H01M 8/0258* (2013.01)

(58) Field of Classification Search
CPC ... H01M 8/0271–0284; H01M 8/0247; H01M 8/0258; H01M 8/028; H01M 8/2486; H01M 8/242
See application file for complete search history.

(56) References Cited

U.S. PATENT DOCUMENTS 8,642,227 B2 * 2/2014 Harrington ......... H01M 8/2485
429/458
2002/0122970 A1 9/2002 Inoue et al.
(Continued)

FOREIGN PATENT DOCUMENTS

JP   H11-204122 A   7/1999
JP   2006-127947 A  5/2006
(Continued)

*Primary Examiner* — Ula C Ruddock
*Assistant Examiner* — Armindo Carvalho, Jr.
(74) *Attorney, Agent, or Firm* — Foley & Lardner LLP

(57) ABSTRACT

A fuel cell FC that includes a cell structure including an anode electrode, a cathode electrode, and an electrolyte that intervenes between the anode electrode and the cathode electrode; and a pair of separators that forms an anode gas flow area and a cathode gas flow area between the cell structure and an anode-side separator and a cathode-side separator of the pair of separators, respectively. The fuel cell further includes a first sealing portion and a second sealing portion that are disposed on an anode electrode side of the cell structure to enclose respectively the anode gas flow area and an outer periphery of the first sealing portion. A flow path for oxygen-containing gas is formed between the first sealing portion and the second sealing portion.

11 Claims, 9 Drawing Sheets

(51) Int. Cl.
*H01M 8/242* (2016.01)
*H01M 8/2425* (2016.01)
*H01M 8/2465* (2016.01)
*H01M 8/0276* (2016.01)
*H01M 8/028* (2016.01)
*H01M 8/2483* (2016.01)
*H01M 8/0258* (2016.01)

(56) References Cited

U.S. PATENT DOCUMENTS

| | | | | |
|---|---|---|---|---|
| 2004/0247986 | A1* | 12/2004 | Takeguchi | H01M 8/0258 |
| | | | | 429/457 |
| 2010/0047650 | A1* | 2/2010 | Iino | H01M 8/0226 |
| | | | | 429/479 |
| 2012/0107714 | A1* | 5/2012 | Day | H01M 8/2425 |
| | | | | 429/457 |
| 2014/0051006 | A1 | 2/2014 | Hwang et al. | |
| 2015/0207155 | A1* | 7/2015 | Jeong | H01M 8/0273 |
| | | | | 429/481 |
| 2015/0318563 | A1 | 11/2015 | Kuribayashi et al. | |
| 2016/0072136 | A1* | 3/2016 | Kageyama | H01M 8/2483 |
| | | | | 429/463 |

FOREIGN PATENT DOCUMENTS

| | | | |
|---|---|---|---|
| JP | 2007-213965 A | | 8/2007 |
| JP | 2007213965 A | * | 8/2007 |
| JP | 2011-228187 A | | 11/2011 |
| JP | 2012-230875 A | | 11/2012 |

* cited by examiner

FUEL CELL

TECHNICAL FIELD

The present invention relates to improved version of a fuel cell in which a cell structure intervenes between a pair of separators.

BACKGROUND ART

For example, one of conventional fuel cells is described in Patent Document 1. The fuel cell of Patent Document 1 includes a membrane electrode assembly with electrode layers on both sides of an electrolyte layer, and a pair or separators that is disposed to hold the membrane electrode assembly from both sides the membrane electrode assembly. The membrane electrode assembly and the separators each has supplying manifolds and discharging manifolds for reaction gas.

The fuel cell includes ring sealing members that are disposed between the peripheral portions of the membrane electrode assembly and the separators to surround the electrode layers so as to prevent leakage of the reaction gas. Further, the membrane electrode assembly includes sealing members that are disposed around the cathode gas manifolds at the anode side and around the anode gas manifolds at the cathode side. With this configuration, the membrane electrode assembly airtightly separates an anode gas flow area and a cathode gas flow area from each other.

CITATION LIST

Patent Document

Patent Document 1: JP 2011-228187 A

SUMMARY OF INVENTION

Technical Problem

Fuel cells as described above require a measure against gas leakage since the anode gas contains flammable gas (hydrogen), and it is very important to make a further improvement to enhance safety.

The present invention has been made in view of the above-described circumstance in the prior art, and an object of the present invention is to provide a fuel cell in which leakage of anode gas to the outside is prevented, and even in case the sealing portion against the anode gas deteriorates, the anode gas that has passed through a sealing portion can be inactivated before it is discharged to the outside.

Solution to Problem

The fuel cell according to the present invention includes: a cell structure including an anode electrode, a cathode electrode, and an electrolyte that intervenes between the anode electrode and the cathode electrode; and a pair of separators that form an anode gas flow area and a cathode gas flow area between the cell structure and an anode-side separator and a cathode-side separator of the pair of separators, respectively. In the fuel cell, the cell structure and the separators include anode gas manifold holes for flowing an anode gas and cathode gas manifold holes for flowing a cathode gas. The fuel cell further includes a first sealing portion and a second sealing portion that are disposed at a periphery on an anode electrode side of the cell structure to enclose respectively the anode gas flow area including the anode gas manifold holes, and an outer periphery of the first sealing portion, in which the cathode gas manifold holes are disposed and a flow path for the cathode gas is formed between the first sealing portion and the second sealing portion.

Advantageous Effects of Invention

In the fuel cell according to the present invention, a double sealing structure is formed by the first sealing portion and the second sealing portion between the periphery on the anode electrode side of the cell structure and the separator opposed to the anode electrode side, which prevents leakage of the anode gas to the outside. In the fuel cell, even in case the anode gas leaks out through the first sealing portion, the anode gas that has passed through the first sealing portion is mixed and burned with the cathode gas or is diluted with the cathode gas, since cathode gas manifold holes for flowing the cathode gas are disposed and the flow path for the cathode gas is formed between the first sealing portion and the second sealing portion at the outer side of the first sealing portion.

In this way, leakage of the anode gas can be prevented in the fuel cell according to the present invention. Even in case the first sealing portion deteriorates, the anode gas that has passed through the first sealing portion can be inactivated before it is discharged to the outside. As a result, the fuel cell has enhanced safety.

DESCRIPTION OF EMBODIMENTS

First Embodiment

Figure 1:
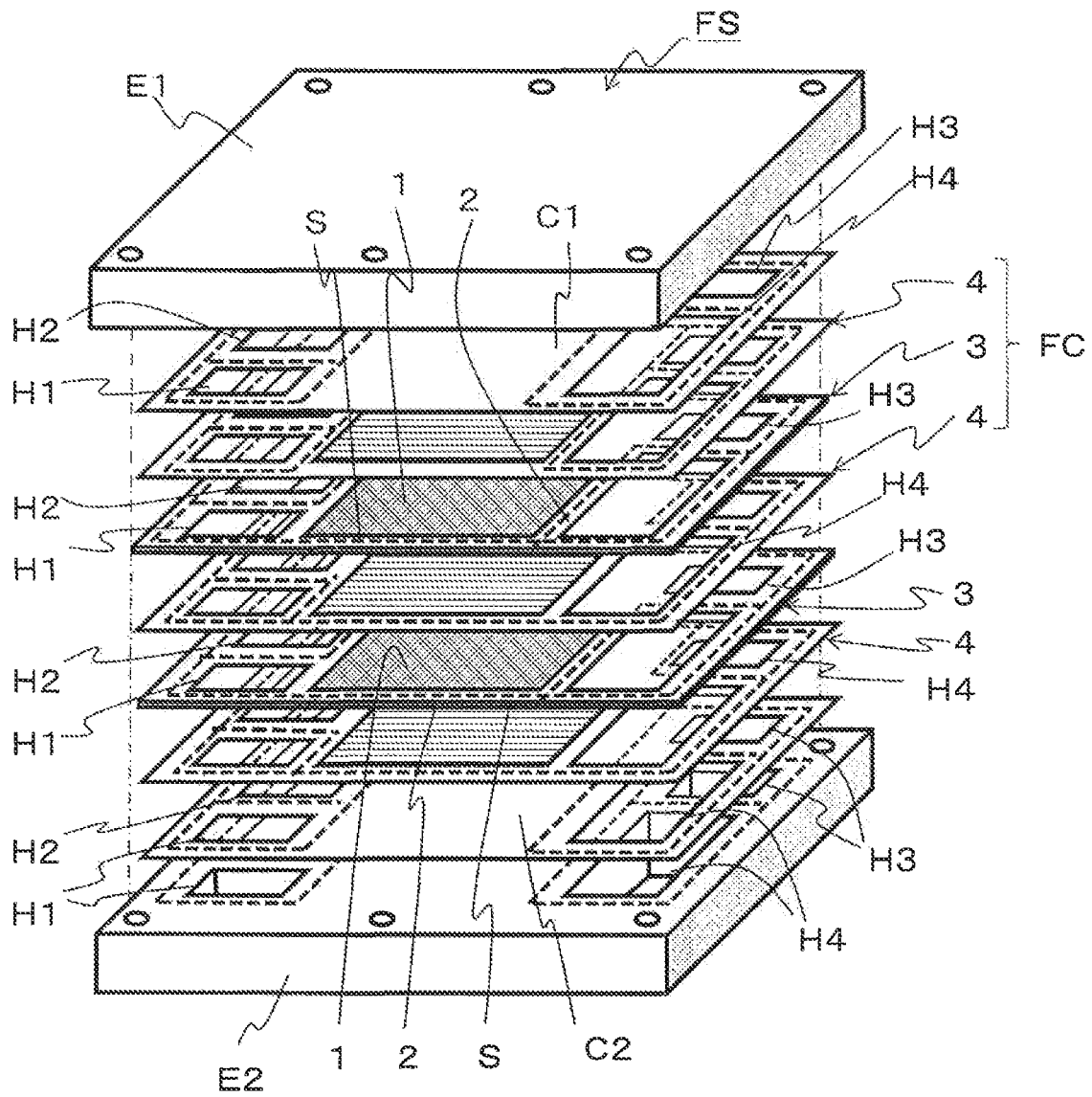
FIG. 1 is an exploded perspective view of a fuel cell stack including fuel cells of the present invention.

FIG. 1 schematically illustrates a fuel cell stack FS that includes fuel cells FC according to the present invention. The fuel cell stack FS in the figure includes cell structures 3, each with a frame 2 around a power generation area 1, and separators 4 that are alternately stacked. While two cell structures 3 are illustrated in FIG. 1, a larger number of cell structures 3 are actually stacked. Further, in the fuel cell stack FS, the number of separators 4 is by one larger than the number of cell structure 3 so that gas flow areas are formed on both sides of each cell structure 3.

Figure 2:
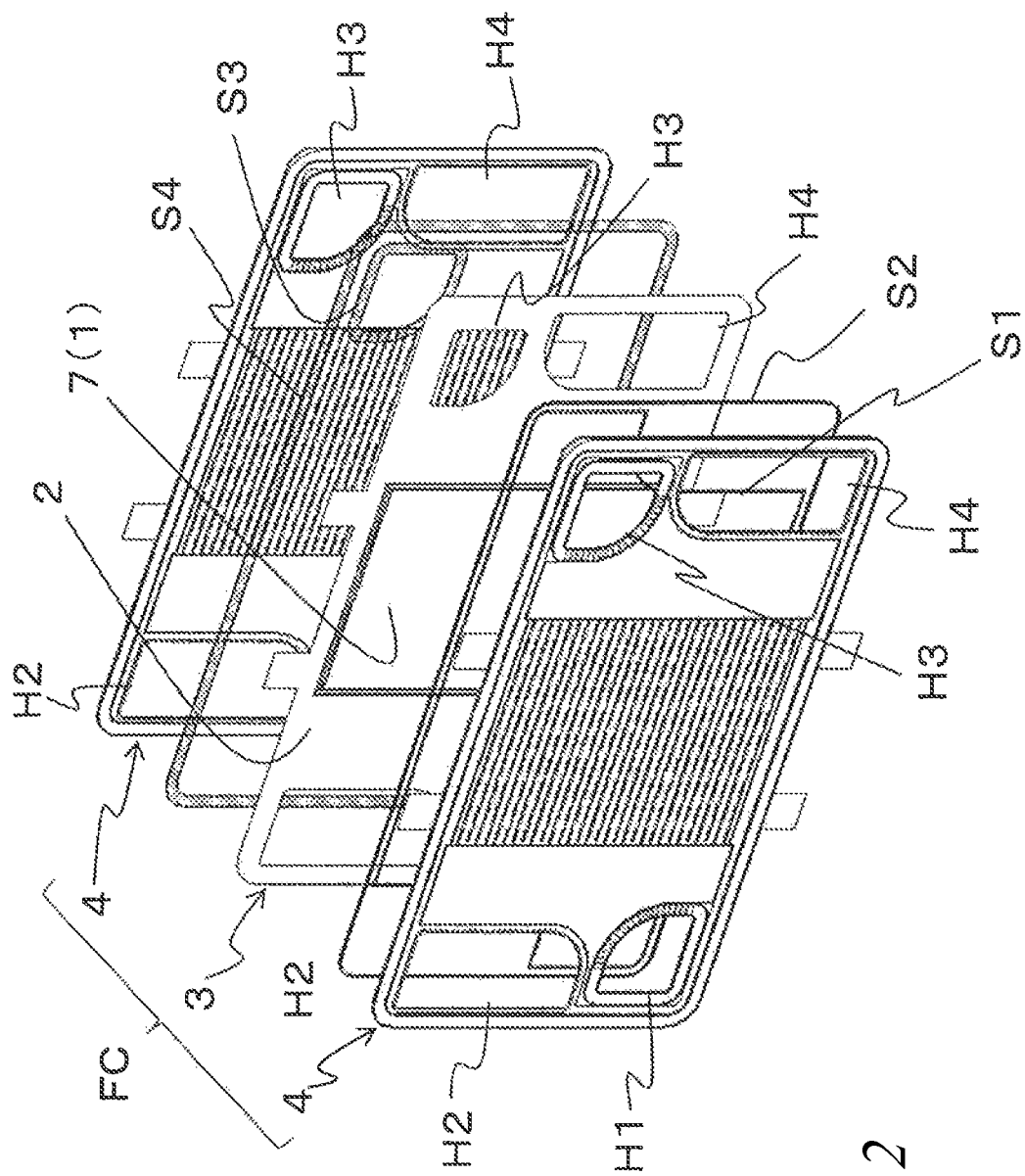
FIG. 2 is a perspective view of a fuel cell illustrating a first embodiment of the present invention.

As illustrated in FIG. 2, each of the fuel cells FC includes a cell structure 3, which includes the frame 2 that holds the periphery of the cell structure 3, and a pair of separators 4, 4. That is, in the fuel cell stack FS in FIG. 1, fuel cells FC adjacent to each other share a separator 4 of the pair of separators between the fuel cells to constitute individual fuel cells FC.

The cell structure 3 is a multilayer structure having a rectangular flat plate shape. As partly illustrated in FIG. 3, an electrolyte 5 intervenes between a cathode electrode (air electrode) 6, which is at the upper side in FIG. 3, and an anode electrode (fuel electrode) 7, which is at the lower side in FIG. 3. Further, the cell structure 3 includes a supporting plate 8 of a porous material such as foamed metal on the side of anode electrode 7. The cell structure 3, which includes the supporting plate 8 for improving the mechanical strength while maintaining the gas permeability for the anode electrode 7, is also referred to as, for example, a metal-supported cell.

The frame 2, which is a part of the cell structure 3, may be made of resin or metal. However, the material is not particularly limited. The frame 2 may be formed integrally with the power generation area 1 that is composed of the electrolyte 5, the cathode electrode 6 and the anode electrode 7. The frame 2 may be constituted by a compressed dense peripheral portion (frame portion) of the supporting plate 8 that is made of a porous material and has a size enough to mount the power generation area 1 on the center.

The cell structure 3 of the embodiment includes a reinforcing plate 9 on the side of the cathode electrode 6, which is made of a gas-permeable material such as expanded metal or metal mesh. The reinforcing plate 9 further improves the mechanical strength while maintaining the gas permeability for the cathode electrode 6.

Each of the separators 4, which is made of a metal material such as stainless steel, is a rectangular flat plate corresponding to the cell structure 3 that has front and back sides with mutually inverted uneven patterns formed by press working. In each fuel cell FC, a cathode-side separator 4 of the pair of separators 4, 4 forms a cathode gas (oxygen-containing gas, air) flow area G2 between the cathode-side separator 4 and the cathode electrode 6 side of the cell structure 3. Further, an anode-side separator 4 forms an anode gas flow area G1 (hydrogen-containing gas, hydrogen gas) between the anode-side separator 4 and the anode electrode 7 side of the cell structure 3.

As described above, in the fuel cell stack FS, fuel cells FC adjacent to each other share a separator 4 between them. Accordingly, each shared separator 4 forms the cathode gas flow area G2 on one side, which is the upper side in FIG. 3, and the anode gas flow area G1 on the other side, which is the lower side in FIG. 3, and separates the flow areas G1, G2 from each other. The flow areas G1, G2 refer to the entire areas where only the respective gases flow.

The frame 2 of the cell structure 3 and the separators 4 each have a manifold hole H1 for supplying the anode gas and a manifold hole H2 for discharging the cathode gas at one short side. Further, they each have a manifold hole H3 for discharging the anode gas and a manifold hole H4 for supplying the cathode gas at the other short side. When the cell structures 3 and the separators 4 are stacked, the manifold holes H1 to H4 communicate with each other to form respective manifolds in which fuel gas or air flows.

The fuel cell stack FS includes end plates E1, E2 that are disposed on the upper and lower ends of the stack of the fuel cells FC via current collector plates C1, C2 as illustrated in FIG. 1. In the fuel cell stack FS, the end plates E1, E2 at both sides are coupled to each other by bolts and nuts to restrain the stack. When coupling the end plates E1, E2, a spring may be disposed to apply a stacking load according to need. The current collector plates C1, C2 and one of the end plates (end plate E2) each have manifold holes H1 to H4.

The fuel cell stack FS includes sealing members S that are disposed between the components, which are illustrated by dashed lines in FIG. 1. The sealing members S are mainly disposed between peripheral portions of the cell structures 3 and the separators 4 and around the manifold holes H1 to H4. The details will be described below.

Figure 3:
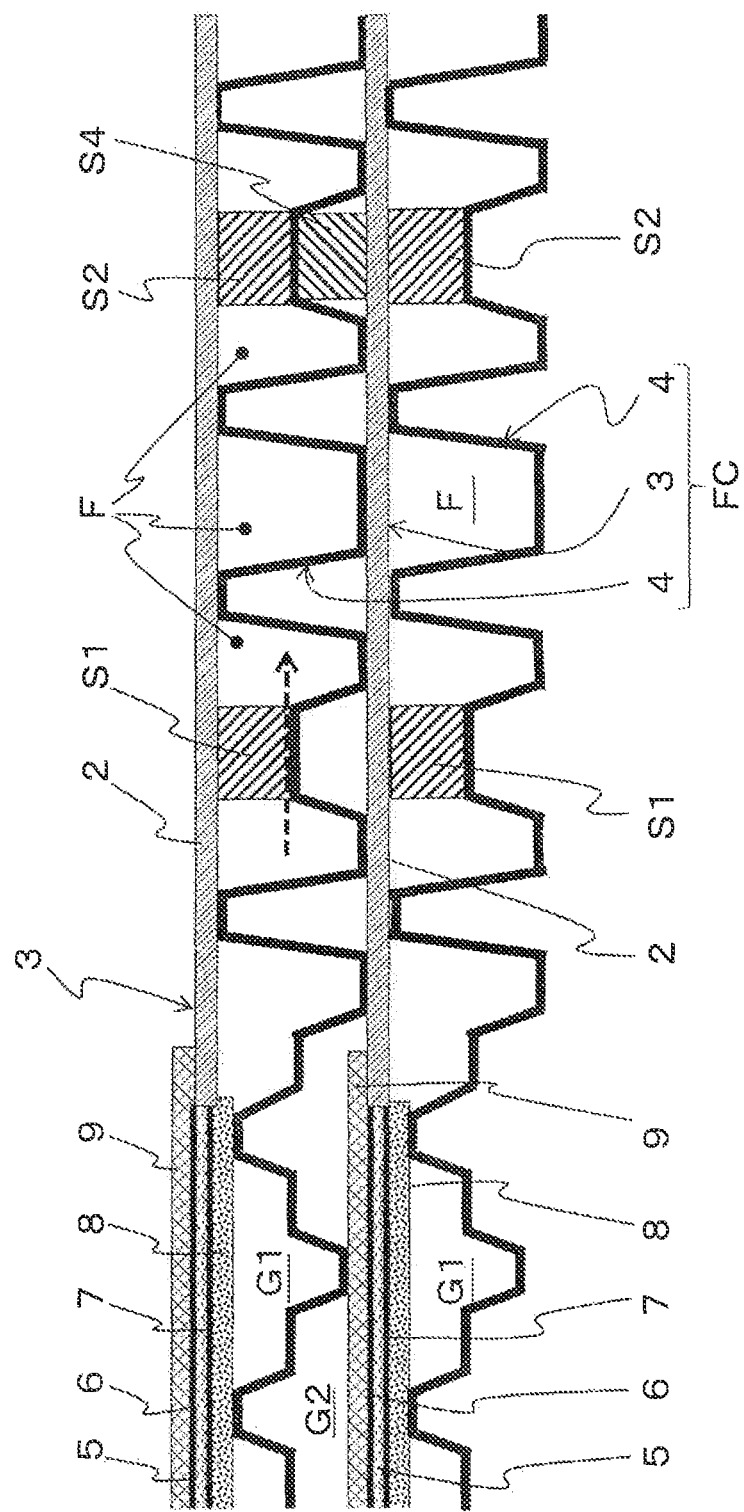
FIG. 3 is a cross-sectional view of the fuel cell transverse to a long side of the fuel cell.
Figure 4:
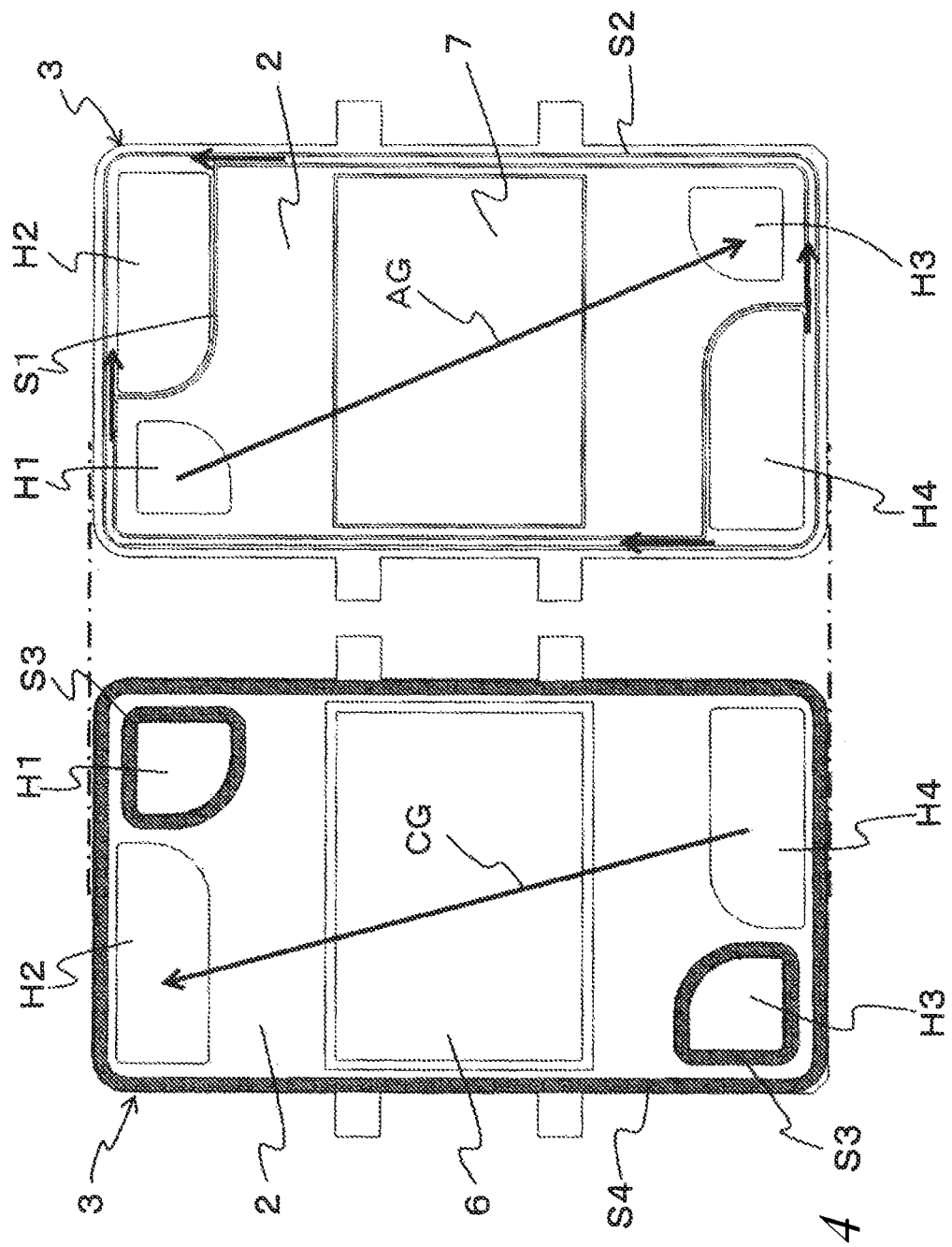
FIG. 4 is a plan view illustrating a cathode electrode side and an anode electrode side of a cell structure.

As illustrated in FIG. 2 to FIG. 4, each fuel cell FC of the fuel cell stack FS includes a first sealing portion S1 and a second sealing portion S2 that are disposed on the anode electrode 7 side of the cell structure 3 to enclose respectively the anode gas flow area G1 and the outer periphery of the first sealing portion S1. The first and second sealing portions S1, S2 are disposed at a constant interval so as to form a flow path F for oxygen-containing gas.

On the anode electrode 7 side of the cell structure 3 of the fuel cell FC, the anode gas manifold holes H1, H3 are included in the anode gas flow area G1 while the cathode gas manifold holes H2, H4 are formed between the first sealing portion and the second sealing portion.

Further, each fuel cell FC includes a third sealing portion and a fourth sealing portion that are disposed on the cathode electrode 6 side of the cell structure 3 to enclose respectively the anode gas manifold holes H1, H3 and the cathode gas flow area G2.

That is, in the fuel cell FC, the first sealing portion S1 having an endless shape is disposed on the anode electrode 7 side of the cell structure 3 to enclose the anode gas flow area G1, i.e. the flow area G1 that includes the anode electrode 7 and the manifold holes H1, H3, as illustrated in the right side of FIG. 3. The cathode gas manifold holes H2, H4 are located at an outer side of the first sealing portion S1. Further, the second sealing portion S2 having an endless shape is disposed on the anode electrode 7 side of the cell structure 3 along the peripheral portion of the frame 2 to enclose the anode gas flow area G1 and the cathode gas manifold holes H2, H4.

The third sealing portion S3 having an endless shape is disposed on the cathode electrode 6 side of the cell structure 3 around the anode gas manifold holes H1, H3 as illustrated in the left side of FIG. 3. Further, the fourth sealing portion S4 having an endless shape is disposed on the cathode electrode 6 side and along the peripheral portion of the frame 2 to enclose the cathode gas flow area G2, i.e. the flow area G2 that includes the cathode electrode 6 and the manifold holes H2, H4.

The fuel cell FC having the above-described configuration generates electric energy by electrochemical reaction at the electrodes 6, 7 and the electrolyte 5 when the cathode gas and the anode gas are supplied respectively to the cathode electrode 6 and the anode electrode 7 of the cell structure 3.

On the anode electrode 7 side of the fuel cell FC, which is illustrated in the right side of FIG. 3, the anode gas (arrow AG) flows from the supplying manifold hole H1 to the discharging manifold hole H3 through the anode electrode 7. On the cathode electrode 6 side, which is illustrated in the left side of FIG. 3, the cathode gas (arrow CG) flows from the supplying manifold hole H4 to the discharging manifold H2 through the cathode electrode 6. The cathode gas flows in the opposite direction from the anode gas (AG).

In the fuel cell FC of this embodiment, a flow path F for oxygen-containing gas is formed between the first sealing portion S1 and the second sealing portion S2 on the anode electrode 7 side of the cell structure 3, and the cathode gas manifold holes H2, H4 are formed in the flow path F. Accordingly, the cathode gas, which is oxygen-containing gas, constantly flows in the flow path F as illustrated by the short arrows in FIG. 3. The cathode gas supplied to the flow path F contains a sufficient amount of oxygen since it is a part of the cathode gas before being supplied to the power generation area 1.

In the fuel cell FC having the above-described configuration, the first sealing portion S1 and the second sealing portion S2 form a double sealing structure between the anode electrode 7 side of the cell structure 3 and the separator 4 opposed thereto so as to prevent leakage of the anode gas to the outside.

In the fuel cell FC, even in case the anode gas leaks out through the first sealing portion S1 as illustrated by the dashed arrow in FIG. 3, the leaked anode gas is mixed and burned with the cathode gas (oxygen-containing gas) or diluted with the cathode gas in the flow path F since the flow path F for the oxygen-containing gas is present between the first sealing portion S1 and the second sealing portion S2.

In this way, the double sealing structure of the fuel cell FC can prevent leakage of the anode gas to the outside. Even in case the first sealing portion S1 deteriorates, the anode gas that has passed through the first sealing portion S1 can be inactivated in the flow path F before it is discharged to the outside. This can prevent the high concentration of anode gas from being discharged to the outside. Therefore, the safety can be enhanced.

In the fuel cell FC, the cathode gas manifold holes H2 H4 are located between the first and second sealing portions S1, S2 so that the cathode gas as oxygen-containing gas flows in the flow path F. Therefore, it is not necessary to provide an independent supply system of the oxygen-containing gas. As a result, a simplification of the device structure and the overall system and a cost reduction can be achieved.

FIG. 5 to FIG. 9 illustrates fuel cells and fuel cell stacks according to second to sixth embodiments of the present invention. In the following embodiments, the same reference signs are denoted to the same components as those of the first embodiment, and the detailed description is omitted.

Second Embodiment

In a fuel cell FC of a preferred embodiment, the sealing strength of first and second sealing portions S1, S2 is different from the sealing strength of third and fourth sealing portions S3, S4. In a more preferred embodiment, the sealing strength of the first and second sealing portions S1, S2 may be greater than the sealing strength of the third and fourth sealing portion S3, S4.

Figure 5:
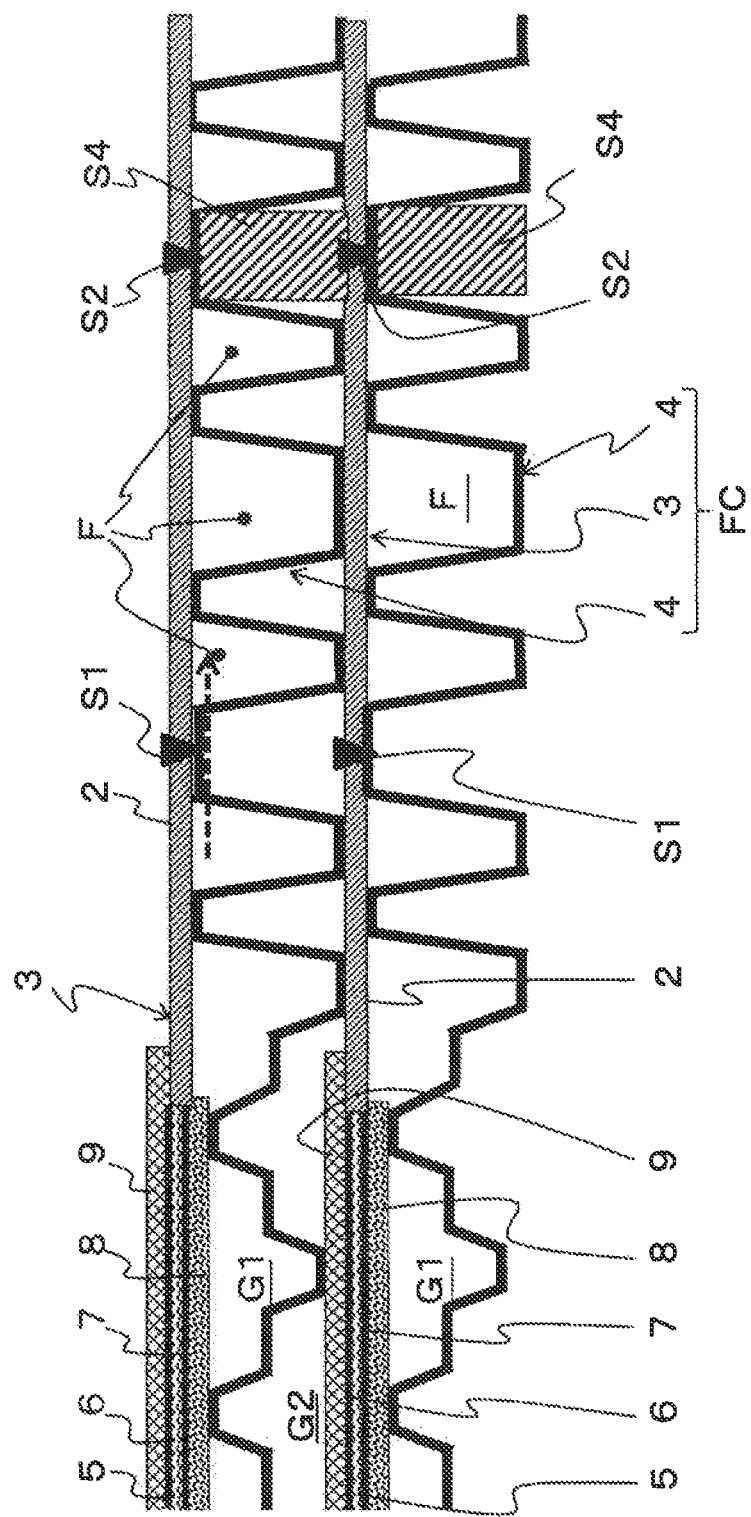
FIG. 5 is a cross-sectional view of a fuel cell according to a second embodiment of the present invention transverse to a long side of the fuel cell.

In the fuel cell FC as illustrated in FIG. 5, the first and second sealing portions S1, S2 are formed by welding while the fourth sealing portion S4 is formed by a glass material such as low-crystalline glass. Accordingly, the sealing structure of the fuel cell FC is such that the sealing strength is different between the anode side and the cathode side, and the sealing strength is relatively high at the anode side where the sealing portions are formed by welding. The third sealing portion (S3) does not appear in FIG. 5, because it is a cross-sectional view transverse to a long side of the fuel cell FC.

The first and third sealing portions S1, S3 contact both anode gas and cathode gas. The second and fourth sealing portions S2, S4 mainly contact the cathode gas. To adapt the fuel cell FC to this environment, the sealing method, the sealing material, the sealing structure and the like of the sealing portions S1 to S4 are suitably selected so that the sealing portions have different sealing strengths according to the type of contacting gas and the like.

In the fuel cell FC having this configuration, the double sealing structure by the first and second sealing portions S1, S2 can prevent leakage of the anode gas to the outside as with the previously-described embodiment. In the fuel cell FC, even in case the first sealing portion S1 deteriorates, the anode gas that has passed through the first sealing portion S1 as illustrated by the dashed arrow in the figure is burned or diluted in a flow path F and thereby inactivated before it is discharged to the outside.

In addition to the above-described functions and effects, an improvement of the robustness of the sealing portions S1 to S4 against erosion, oxidation and reduction can be achieved in the fuel cell FC since the first and second sealing portions S1, S2 have a different sealing strength from the third and fourth sealing portions S3, S4. This can further improve the reliability and the safety.

Furthermore, a further improvement of the robustness of the sealing portions S1 to S4 against erosion, oxidation and reduction is achieved in the fuel cell FC since the sealing strength of the first and second sealing portions S1, S2 is greater than the sealing strength of the third and fourth sealing portions S3, S4. Since the welding portions, which are made of metal, deteriorate (form an oxide layer and become brittle) in a high-temperature oxidative environment, it is desirable that they are kept in a reductive atmosphere. In light of this, the first and second sealing portions S1, S2 at the anode gas side are formed by welding in this embodiment. Therefore, the above-described improvement of the robustness is achieved.

In the embodiment, the first and second sealing portions S1, S2 are formed by welding while the third and fourth sealing portions S3, S4 are formed from a glass material, so that they have different sealing strengths. The sealing strength can also be controlled, for example, by increasing/decreasing the welding area or changing the composition of the glass material. For example, it is also possible that the first sealing portion S1 at the anode side and the third sealing portion S3 at the cathode side are formed by welding while the second sealing portion S2 at the anode side and the fourth sealing portion S4 at the cathode side are formed from a glass material, so that the sealing portions S1 to S4 have different sealing strengths.

Third Embodiment

Figure 6:
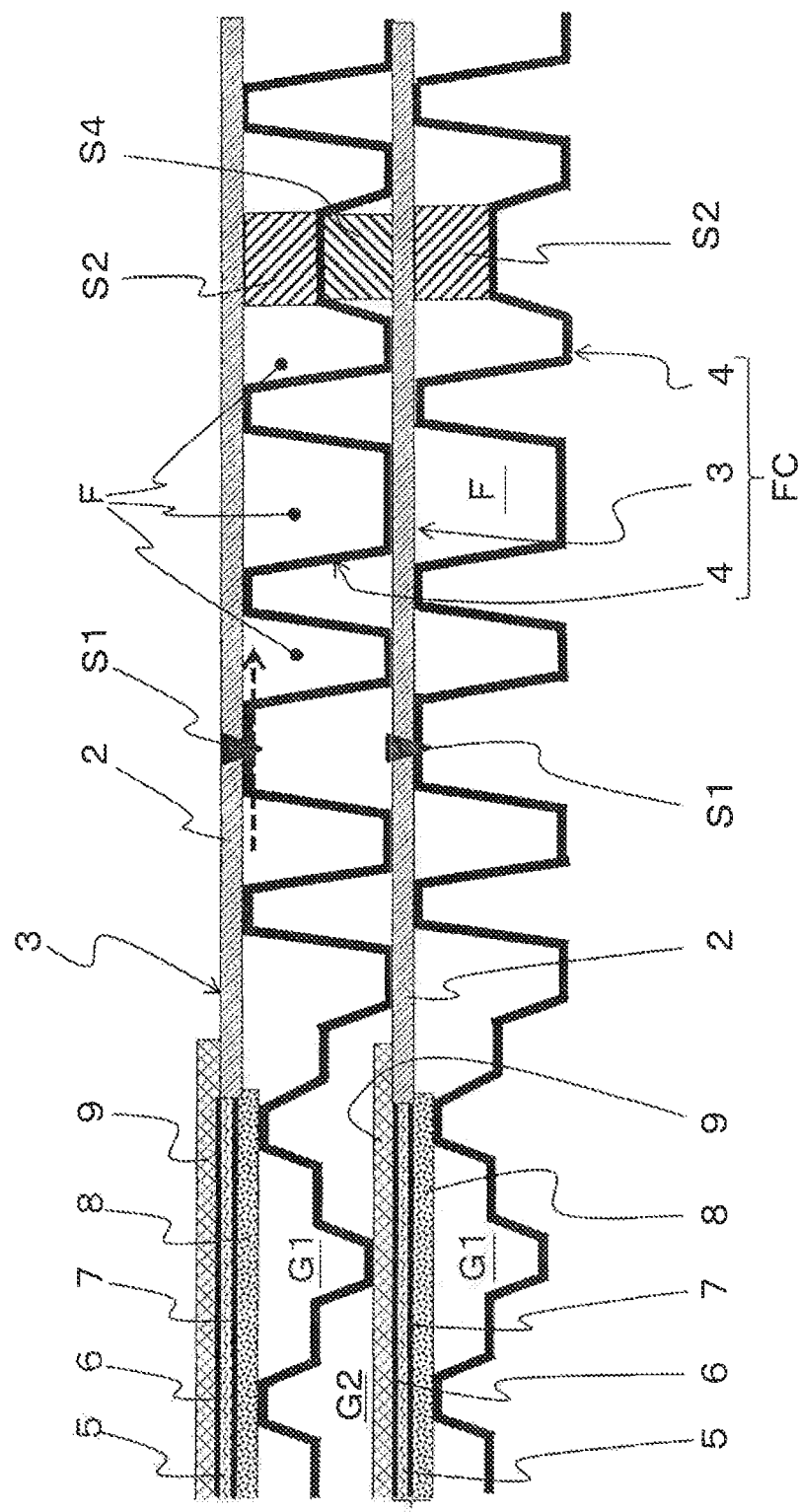
FIG. 6 is a cross-sectional view of a fuel cell according to a third embodiment of the present invention transverse to a long side of the fuel cell.

In a fuel cell FC of this embodiment, the sealing strength of a first sealing portion S1 is different from the sealing strength of a second sealing portion S2. In a more preferred embodiment of the fuel cell FC, the sealing strength of the first sealing portion S1 is greater than the sealing strength of the second sealing portion S2. In a specific example of the fuel cell FC as illustrated in FIG. 6, the first sealing portion S1 is formed by welding while the second sealing portion S2 is formed from a glass material.

In the fuel cell FC having this configuration, the first sealing portion S1 and the second sealing portion S2 exhibit different fracture modes (are vulnerable to different types of input). With this configuration, the fuel cell FC can have the same functions and effects of those of the previously-described embodiments. Furthermore, this configuration can prevent the first and second sealing portions S1, S2 from being simultaneously broken by a certain input.

Since the sealing strength of the first sealing portion S1 is greater than the sealing strength of the second sealing portion S2, the fuel cell FC has improved sealing function of the first sealing portion S1 against the anode gas. Furthermore, in the fuel cell FC, even in case the first sealing portion S1 deteriorates, the anode gas that has passed through the first sealing portion S1 is burned or diluted in a flow path F in which oxygen-containing gas flows and can thereby be inactivated before it is discharged to the outside.

Since the first sealing portion S1 is formed by welding while the second sealing portion S2 is formed from a glass material, the fuel cell can have improved sealing function against the anode gas. Further, the second sealing portion S2 becomes soft and has reduced brittleness at high temperature, which contributes to an improvement of the robustness of the sealing function.

Fourth Embodiment

Figure 7:
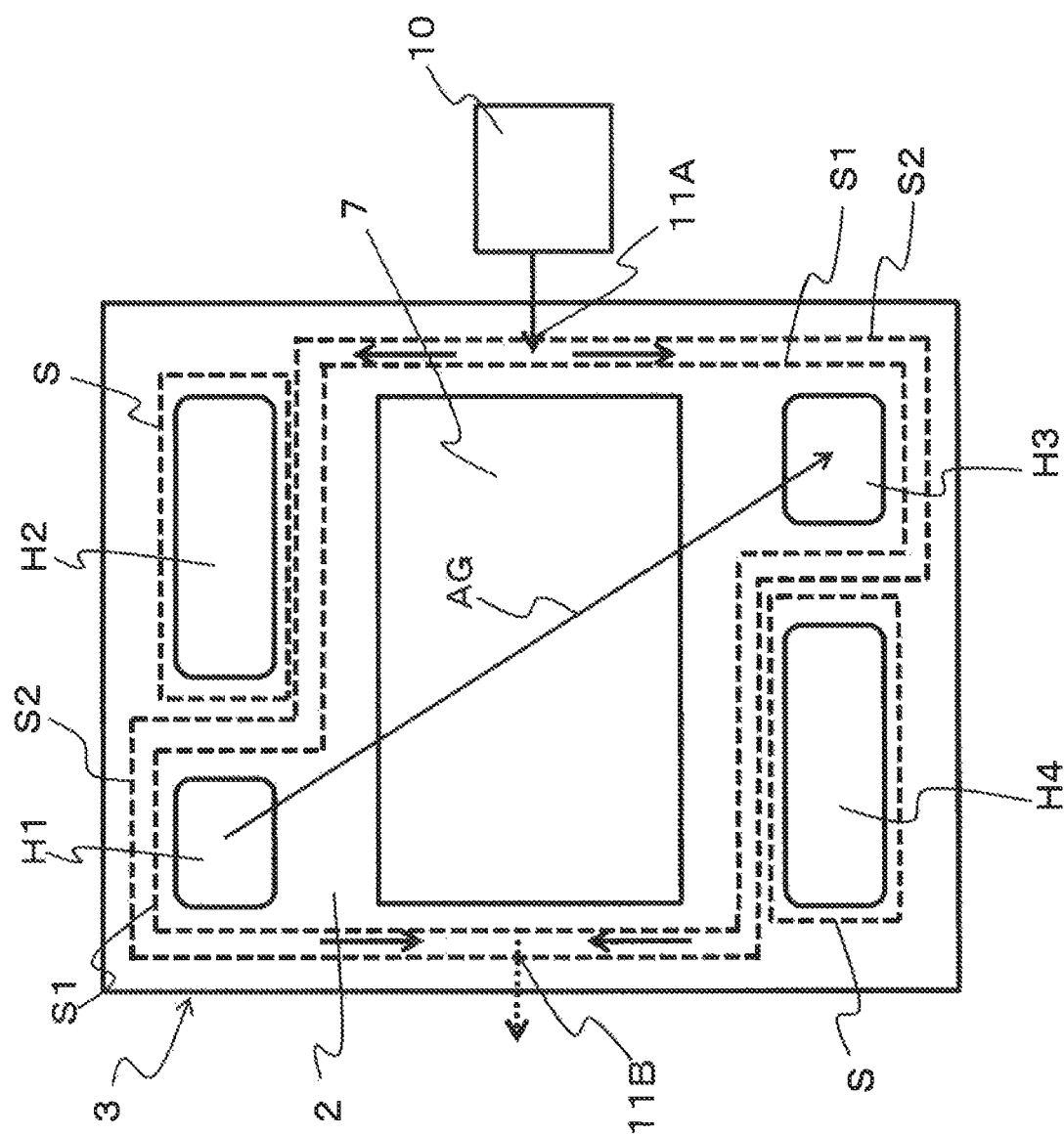
FIG. 7 is a plan view of an anode electrode side according to a fourth embodiment of the present invention.

In a fuel cell FC in FIG. 7, first and second sealing portions S1, S2 are disposed on anode electrode 7 side of a cell structure 3 to enclose an anode gas flow area G1 excluding cathode gas manifold holes H2, H4. In the fuel cell FC, a flow path for oxygen-containing gas is formed between the first and second sealing portions S1, S2, and the oxygen-containing gas is constantly supplied to the flow path F from a source 10. Further, in the fuel cell FC in the figure, sealing members S, S are disposed on the anode electrode 7 side, to enclose the cathode gas manifold holes H2, H4.

In this configuration, the fuel cell FC has an inlet 11A of the oxygen-containing gas in the flow path F. For example, the source 10 may be either a part of a cathode gas supplying system or an independent source for supplying the oxygen-containing gas. Further, the oxygen-containing gas may be oxygen gas. This can further promote mixture and combustion of anode gas that has leaked out to the flow path F, which contributes to a further inactivation of the anode gas.

In this embodiment, an outlet 11B may be formed in the flow path F as illustrated by the dashed arrow in the figure in order to improve flow of the oxygen-containing gas in the flow path F. Further, this embodiment is an example in which the sealing members S, S enclose the cathode gas manifold holes H2, H4. Instead, the second sealing portion S2 may be split at the manifold holes H2, H4 so that it is disposed at both the inner and outer sides of the manifold holes H2, H4.

Fifth Embodiment

Figure 8:
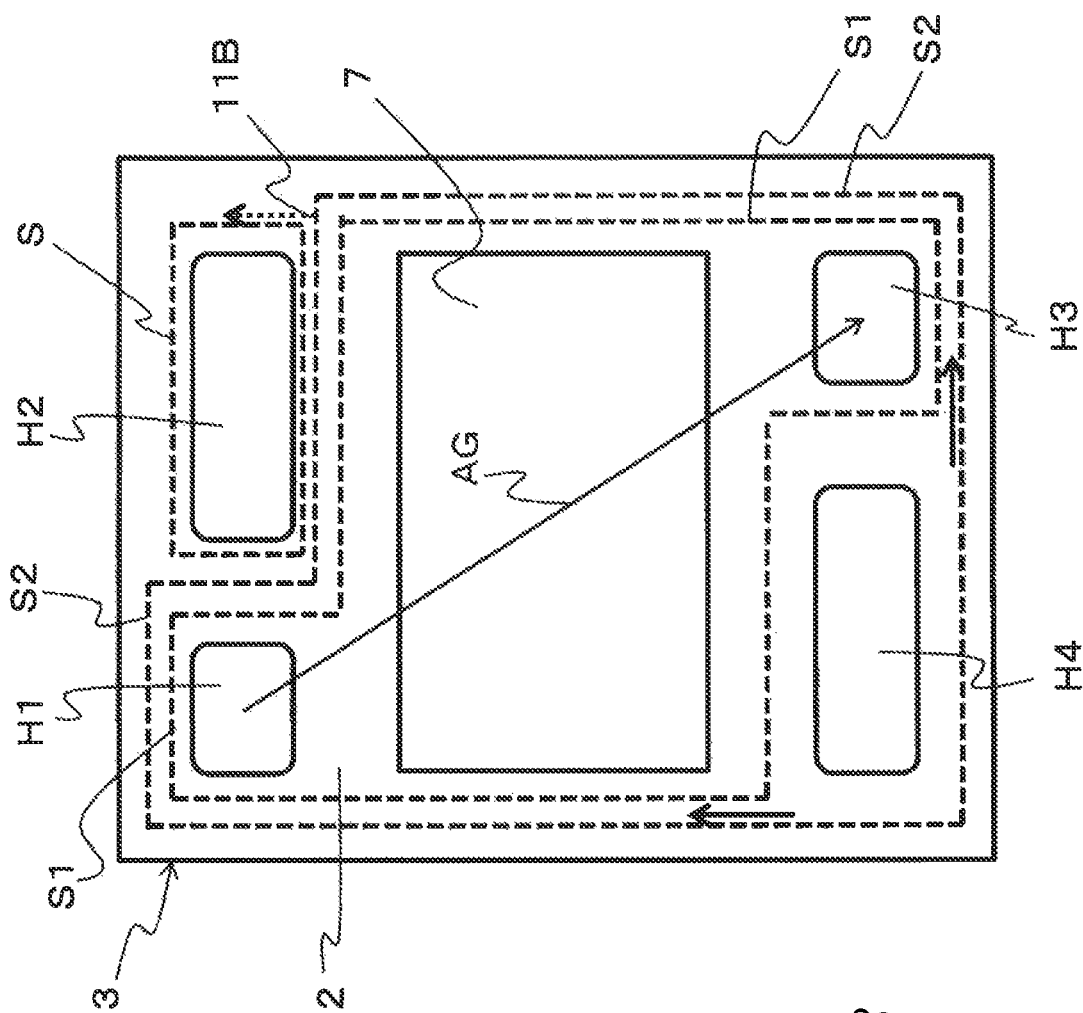
FIG. 8 is a plan view of an anode electrode side according to a fifth embodiment of the present invention.

In a fuel cell FC in FIG. 8, a flow path F for oxygen-containing gas is formed between first and second sealing portions S1, S2 on an anode electrode 7 side of a cell structure 3, and one of cathode gas manifold holes H2, H4 is located in the flow path F. In the illustrated example, the manifold hole H4 for supplying the cathode gas is located in the flow path F, and a sealing member S is disposed to enclose the cathode gas discharging manifold hole H2. In this configuration, an outlet 11B of the oxygen-containing gas may be formed near the cathode gas discharging manifold hole H2 as illustrated by the dashed arrow in the figure. A flow path connecting the outlet 11B to the manifold hole H2 may be further formed.

In the fuel cell FC, as with the previously-described embodiments, the double sealing structure by the first and second sealing portions S1, S2 prevents leakage of anode gas to the outside. Even in case the first sealing portion S1 deteriorates, the anode gas that has passed through the first sealing portion S1 is burned or diluted in the flow path F and can thereby be inactivated before it is discharged to the outside.

Sixth Embodiment

Figure 9:
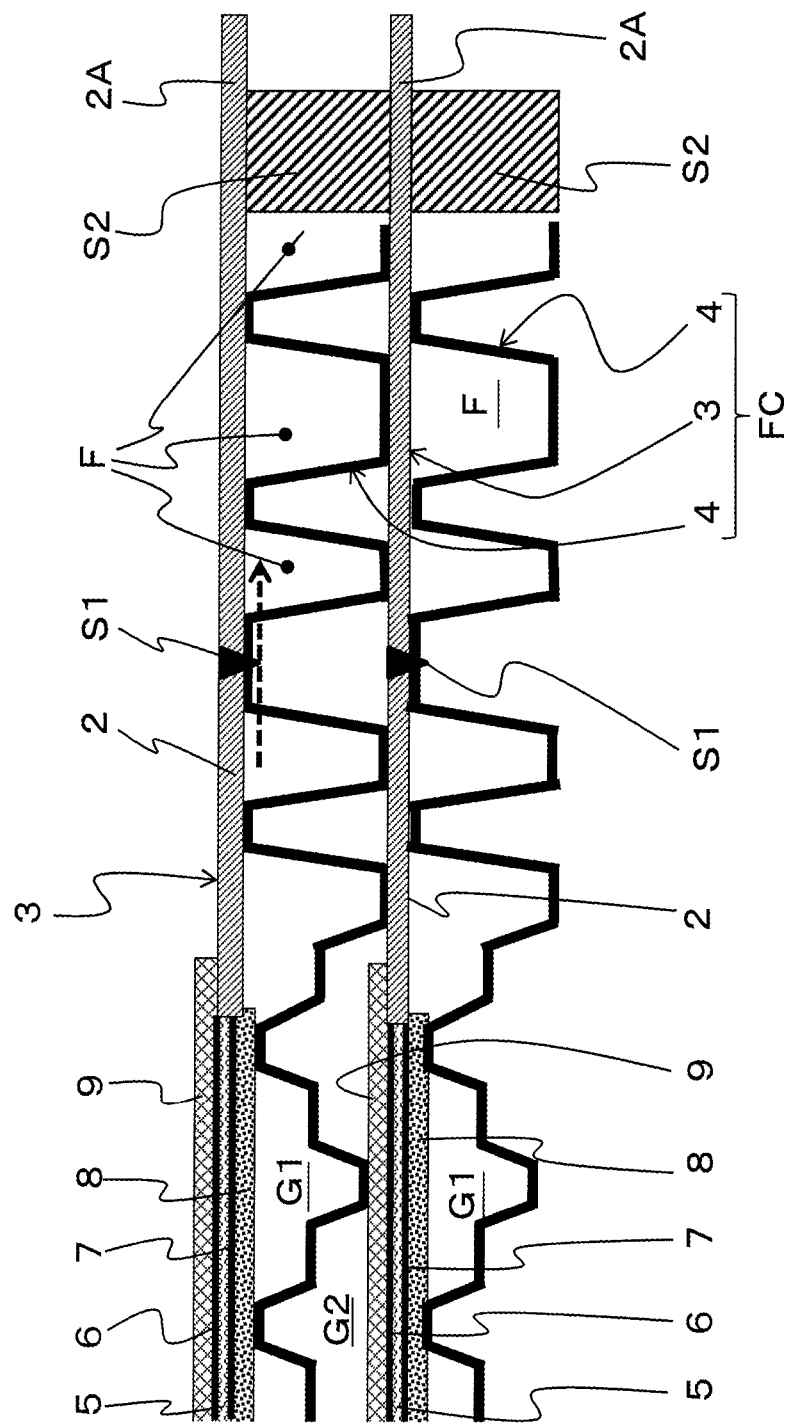
FIG. 9 is a cross-sectional view of a main part of a fuel cell stack according to a sixth embodiment of the present invention.

A fuel cell stack FS in FIG. 9 includes stacked fuel cells FC of any of the previously-described embodiments (see FIG. 2), in which fuel cells FC adjacent to each other share a separator 4 between the fuel cells to constitute individual fuel cells. Further, in the fuel cell stack FS, a cell structure 3 of each fuel cell FC includes a frame 2 that holds the periphery of the cell structure 3.

In the fuel cell stack FS, the frame 2 of each cell structure 3 includes an extended portion 2A that is disposed at the outer periphery to extend outward beyond the outer edge of each separator 4. In the fuel cell stack FS, second sealing portions S2 are disposed between the extended portions 2A, 2A of the frames 2, 2 of cell structures 3, 3 adjacent to each other.

As described in the previous embodiments, the second sealing portions S2 enclose the outer peripheries of first sealing portions S1 that enclose anode gas flow areas G1. However, the second sealing portions S2 of this embodiment are disposed between extended portions 2A, 2A of the frames 2A, i.e. at portions where no separator 4 is present. That is, the second sealing portions S2 are integrated with respective fourth sealing portions (S4) disposed on the cathode electrodes 6 side of the cell structures 3.

In the fuel cell stack FS, although the second sealing portions S2 are integrated with the fourth sealing portions S4, first sealing portions S1 and the second sealing portions S2 seal respectively anode gas and cathode gas. Further, in the fuel cell stack FS, flow paths F for oxygen-containing gas are formed between the first sealing portions S1 and the second sealing portions S2. Considering this structure, it is preferred that the oxygen-containing gas in the flow paths F is the cathode gas.

In the fuel cell stack FS, as with the fuel cells FC of the previously-described embodiments, the double sealing structure by the first and second sealing portions S1, S2 prevents leakage of the anode gas to the outside. In the fuel cell stack FS, even in case the first sealing portions S1 deteriorate, the anode gas is burned or diluted in the flow paths F and can thereby be inactivated before it is discharged to the outside.

In the fuel cell stack FS, since the second sealing portions S2 are integrated with the fourth sealing portions S4, the number of parts or the number of production steps can be reduced accordingly. Therefore, an improvement of the production efficiency and a cost reduction can be achieved.

The configuration of the fuel cell and the fuel cell stack according to the present invention is not limited to those of the above-described embodiments. Without departing from the features of the present invention, suitable changes can be made in the details of the configuration, and the configurations of the above-described embodiments can be suitably combined.

The above-described embodiments are examples in which the first sealing portion S1 and the second sealing portions S2 are disposed on the anode electrode 7 side of the cell structure 3, and the cathode gas manifold holes H2, H4 are located at the outer side of the first sealing portion S1.

In the fuel cell FC of the present invention, it is only necessary that the gas flow areas G1, G2 are airtightly separated from each other. Therefore, the cathode gas manifold holes H2, H4 may be disposed on the anode electrode 7 side and at the inner side of the first sealing portion S1, and another sealing portion (sealing portions S in FIG. 7 and FIG. 8) may be disposed around the manifold holes H2, H4. In this case, an independent source 10 as illustrated in FIG. 7 or a communication path of cathode gas (oxygen-containing gas) from the manifold holes H2, H4 to the flow path F may be employed as a structure for supplying the oxygen-containing gas to the flow path F. With this configuration, the same functions and effects as the above-described embodiments can be obtained.

REFERENCE SIGNS LIST

F Flow path
FC Fuel cell
FS Fuel cell stack
G1 Anode gas flow area
G2 Cathode gas flow area
H1, H3 Anode gas manifold hole
H2, H4 Cathode gas manifold hole
S1 First sealing portion
S2 Second sealing portion
S3 Third sealing portion
S4 Fourth sealing portion
2 Frame
2A Extended portion
3 Cell structure
4 Separator
5 Electrolyte
6 Cathode electrode
7 Anode electrode

The invention claimed is:

1. A fuel cell, comprising:
a cell structure including an anode electrode, a cathode electrode, an electrolyte that intervenes between the anode electrode and the cathode electrode, and a metal frame at a periphery of the cell structure;
a pair of separators that forms an anode gas flow area and a cathode gas flow area between the cell structure and an anode-side separator and a cathode-side separator of the pair of separators, respectively, and
a first sealing portion and a second sealing portion that are disposed at a periphery of the metal frame on an anode electrode side of the cell structure,
wherein the metal frame and the pair of separators comprise anode gas manifold holes configured for flowing the anode gas and cathode gas manifold holes configured for flowing the cathode gas, the cathode gas manifold holes comprising an inlet and an outlet,
wherein the first sealing portion and the second sealing portion enclose the anode gas flow area comprising the anode gas manifold holes and an outer periphery of the first sealing portion, respectively,
wherein the cathode gas manifold holes are disposed in a flow path for the cathode gas formed between the first sealing portion and the second sealing portion such that the flow path for the cathode gas has an endless shape, the flow path for the cathode gas comprising a first part and a second part formed to allow a clockwise flow of cathode gas from the inlet to the outlet and a counter-clockwise flow of cathode gas from the inlet to the outlet, respectively.

2. The fuel cell according to claim 1, further comprising: a third sealing portion and a fourth sealing portion that are disposed on a cathode electrode side of the cell structure to enclose respectively the anode gas manifold holes and the cathode gas flow area.

3. The fuel cell according to claim 2, wherein the first sealing portion and the second sealing portion have a sealing strength different from the third sealing portion and the fourth sealing portion.

4. The fuel cell according to claim 3, wherein a sealing strength of the first sealing portion and the second sealing portion is greater than a sealing strength of the third sealing portion and the fourth sealing portion.

5. The fuel cell according to claim 1, wherein the first sealing portion has a sealing strength different from the second sealing portion.

6. The fuel cell according to claim 5, wherein a sealing strength of the first sealing portion is greater than a sealing strength of the second sealing portion.

7. The fuel cell according to claim 6, wherein the first sealing portion is formed by welding, and the second sealing portion is formed from a glass material.

8. A fuel cell stack, comprising a plurality of fuel cells that are stacked, the plurality of fuel cells comprising the fuel cell according to claim 1,
wherein adjacent fuel cells share one of the pair of separators between the adjacent fuel cells.

9. The fuel cell stack according to claim 8,
wherein the metal frame comprises an extended portion that is disposed at an outer periphery of the metal frame extending outward beyond an outer edge of the pair of separators, and
the second sealing portion is disposed between extended portions of adjacent metal frames of adjacent cell structures.

10. The fuel cell according to claim 1, wherein the flow path for the cathode gas is configured such that the cathode gas of the flow path is mixed and burned with anode gas that leaks out through the first sealing portion to the flow path.

11. The fuel cell according to claim 1, wherein the flow path for the cathode gas is configured such that the cathode gas of the flow path dilutes anode gas that leaks out through the first sealing portion to the flow path.

* * * * *